United States Patent [19]

Hartman et al.

[11] 4,239,577

[45] Dec. 16, 1980

[54] HIGH MOISTURE WOOD LAMINATING PROCESS

[75] Inventors: Seymour Hartman, Mahopac; Timothy M. Brown, Holmes, both of N.Y.

[73] Assignee: Champion International Corporation, Stamford, Conn.

[21] Appl. No.: 28,234

[22] Filed: Apr. 9, 1979

[51] Int. Cl.$^3$ .................. B32B 31/20; B32B 21/08; B32B 5/14

[52] U.S. Cl. .................. 156/312; 144/309 Q; 156/327; 156/331; 156/335; 428/212; 428/528; 428/535

[58] Field of Search .................. 144/309 P, 309 Q; 156/60, 312, 327, 331, 335; 428/212, 535, 528

[56] References Cited

U.S. PATENT DOCUMENTS

| | | | |
|---|---|---|---|
| 3,919,017 | 11/1975 | Shoemaker et al. | 156/62.2 |
| 4,115,178 | 9/1978 | Cone et al. | 156/291 |

FOREIGN PATENT DOCUMENTS

469591  8/1975  U.S.S.R. .

OTHER PUBLICATIONS

Chen & Rice, "Veneer and Assembly Condition Effects on Bond Quality in Southern Pine Plywood," Forest Products Journal, vol. 23, No. 10, Oct. 1973, pp. 46–49.

*Primary Examiner*—John T. Goolkasian
*Assistant Examiner*—Robert A. Dawson
*Attorney, Agent, or Firm*—Evelyn M. Sommer

[57] ABSTRACT

Disclosed is a process for making wood laminates from a plurality of wood plies having relatively high moisture contents. By employing a center ply having a moisture content of at least 3%, relatively high moisture content plies can be employed in the preparation of wood laminates without experiencing defective panels due to the blow out of steam built up during pressing. The outer plies can have moisture contents of as high as 25%. Additionally, interior plies other than the center ply can also have moisture contents similar to that of the center ply or can have moisture contents below that of the outer plies.

10 Claims, No Drawings

HIGH MOISTURE WOOD LAMINATING PROCESS

BACKGROUND OF THE INVENTION

The present invention relates to the preparation of wood laminates, and more particularly to the preparation of wood laminates from high moisture content wood plies.

In preparing wood laminates such as plywood from high moisture plies in the past, it was invariably found that a large number of defects in lamination would occur. It is believed that this problem is directly related to the formation of steam between the plies and a blow out of the stream when pressure is released upon completion of the molding cycle. Thus, it has been necessary in the past to incur sizable operating and capital costs to assure consistently low moisture contents for plies employed in making wood laminates.

In preparing wood laminates such as plywood, it is conventional to provide an odd number of plies. The laminates are typically formed by applying an adhesive to the mating surfaces of the plies, pressing them at essentially ambient temperature for a period of time effective to consolidate the plies into a unitary panel, and then subjecting the consolidated panel to a final curing pressing between hot platens under elevated temperature and pressure for a period of time sufficient to finally set the thermosetting adhesive. When working with wood plies other than extremely dry ones, experience has shown that an excessively large number of panels must be rejected because of poor lamination.

It is our present understanding that the hot platens vaporize the moisture within the plies and drive it toward the center. The temperature gradient throughout the laminate drives the moisture toward the center ply from both ends of the hot platens. In this manner, substantially all the moisture is driven to the center core. At the same time, the resin is curing from the hot platens toward the center glue line. As the temperature builds in the center plies, so does the vapor pressure, and as the press is opened, the built up vapor or steam seeks an avenue of escape and blows the panel.

This problem increases in severity with the moisture content of the plies. In published tests in the Forest Products Journal, Volume 23, No. 10, Chen and Rice indicate that veneer moisture content variation had a dramatic effect on assembly time relationships, and that prolonged assembly times generally produced the highest wood failure results at higher veneer moisture content levels. Adverse effects were obtained even though the moisture contents employed in the study were only within the range of from about 1.3 to about 8.0%. To bring the freshly prepared wet plies down to this moisture content range, substantial drying is necessary. Thus, even with substantial drying, the prior art experienced undue problems of laminate failures.

It would be advantageous to have a process which reduced the need for drying high moisture content plies and veneers and enabled the use of plies and veneers with relatively high moisture contents. This is especially true in view of the recent economic and regulatory stimulus to conserve energy. Reduced drying requirements would also result in savings in capital costs and processing time. Additionally, it would be advantageous to have a process capable of handling high moisture content plies and veneers with reduced failure rates because such a process would reduce the criticality of moisture control and thus make the process more flexible.

SUMMARY OF THE INVENTION

Accordingly, it is an object of the present invention to provide a process for preparing wood laminates from high moisture content wood plies with reduced wood laminate failure rates.

It is another object of the present invention to provide a process for preparing wood laminates from high moisture content plies to thereby result in a net energy savings for the preparation of the laminates.

It is yet another object of the present invention to provide a process for preparing wood laminates of relatively high moisture content which enables better process control.

These and other objects are accomplished by the present invention which provides a process for making wood laminates from a plurality of wood plies which comprises: (a) providing two surface plies having moisture contents of from 5 to 25% (b) providing a center ply having a moisture content at least 3%; (c) applying an adhesive to the mating surfaces of the plies; (d) assembling a panel of the plurality of wood plies by mating the surfaces to which the adhesive has been applied; and (e) pressing the assembled plies under conditions of pressure, temperature and time effective to cure the adhesive.

DETAILED DESCRIPTION OF THE INVENTION

Wood plies used to make laminates typically have moisture contents of from 3 to 5% based on the dry weight of the wood. Woods with higher moisture contents could not be successfully employed, but can be according to the present invention which can use "high" moisture content woods with moistures of greater than 7% and less than 25%. The usual and preferred range for moisture contents for the high moisture plies according to the present invention will be from about 7 to 22%. It will be understood, however, that the utility of the present invention is not limited to high moisture content plies. Indeed, by employing plies within the conventional moisture content range with a center ply of sufficiently reduced moisture content according to the present invention, it is possible to employ outer plies of more widely varying moisture content with reduced wood failure rates. Thus, the process of the present invention enables better and more efficient process control when using plies of conventional moisture contents.

The term "ply" as used herein, shall mean any one thin sheet of wood forming one or a part of one layer in a multi-layered, laminated wood product. The term "veneer" as used herein shall designate an exterior ply or portion thereof in a multi-layered, laminated wood product.

Typical of the varieties of wood which are suitable for use according to this invention are: soft woods such as southern pine, douglas fir, ponderosa pine, aspen and the like, and hard woods such as oak, walnut and birch. This listing is representative only as other woods may also be employed.

Typically, wood laminates of the type prepared according to the present invention will have an odd number of plies, i.e., 3, 5, 7, 9, etc. However, it should be understood that the present invention is not limited to the preparation of laminates containing only odd numbers of plies. Indeed, laminates with an even number of plies can be prepared so long as at least one, but preferably two, of the center plies are of relatively low moisture content, being at least 3%. By providing these low moisture plies, the moisture can be driven from the higher moisture plies during pressing and absorbed in the lower moisture center plies without causing the problem of product blow out.

To prepare a wood laminate according to the invention, two outer surface plies or veneers are provided having moisture contents of from about 7 to about 25%, and preferably from about 8 to about 16%. A center ply is also provided having a moisture content of at least about 3% and preferably about 5%. If desired, a number of intermediate plies can be employed, and as noted, there may be either an even or an odd number of plies. It has been found that when these inner plies have moisture contents of 3% to 7%, the resulting panels have excellent bond strengths when as bonding agents the conventional phenol-formaldehyde adhesive resins are used. An adhesive is applied to the mating surfaces of the plies, and the plies are assembled by mating the surface to which the adhesive has been applied.

Any adhesive composition known in the art to be useful for preparing wood laminates can be employed according to the present invention. However, the adhesive will preferably be one of the more conventional adhesives and will preferably be a composition comprising a member selected from the group consisting of phenol-aldehyde resins, urea-aldehyde resins, melamine-aldehyde resins and combinations of these. A particularly preferred type of adhesive comprises a phenol-aldehyde condensation product having a molar ratio of phenol to aldehyde in the range of 1:1.5 to 1:3 and an alkaline catalyst selected from the group consisting of alkaline earth and alkali metal hydroxides.

While hydroxybenzene-formaldehyde condensation products are most often used as the resin in the adhesive, other phenol-aldehyde resins are in general use and may be employed. Illustrative of some of the aldehydes which may be used are the aliphatic aldehydes such as acetaldehyde and propionaldehyde; aromatic aldehydes, such as benzylaldehyde and furfural; and such other aldehydes as aldol, glyoxal, and crotonaldehyde. Illustrative of some of the phenols which may be employed in place of hydroxybenzene are resorcinol, cresol, pyrocatechol, cresylic acid, xylenols, naphthols, such as polyphenols such as the bis-hydroxyphenyl alkanes as 2,2'-bis-(4-hydroxyphenyl)- propane. The molar ratio of phenol to aldehyde used will typically be from 1:1.5 to 1:3; and will preferably be in the range of 1:1.8 to 1:2.5.

Also in the formation of the adhesive, other constituents usually employed in adhesives used for wood laminates may be added to impart the beneficial characteristics normally obtained by the particular constituents. Necessarily, in the case of phenol-aldehyde resins, an alkaline catalyst, preferably selected from the group consisting of alkali metal and alkaline earth metal hydroxides, is used to catalyze the condensation of the adhesive. Generally, the amount of the hydroxide used is in a molar ratio of hydroxide to phenol in the range of from 0.4:1 to 0.9:1. In addition, accelerators such as alkali metal carbonates, alkali metal silicates, alkali metal borates and alkali metal phosphates may be employed, generally in amounts of from 1 to 20 weight percent of the resin solids. Preferably, at least one filler selected from the group consisting of starch, wood flour, nutshell flour, bark products or agriculture residues, and corn husks, is employed in the adhesive. Fillers such as starch, clays and the like are often used in amounts of from 1 to 10 weight percent of the resin solids.

According to the process, the adhesive of the invention is applied to the mating surfaces of a plurality of wood plies. The surfaces which will be on the exterior of the panel are preferably not coated. The adhesive in applied to the plies generally in amounts from 60 to 90 pounds, preferably from 75 to 90 pounds, per 1000 square feet of double glue line, with southern pine and 60-80 pounds, per 1000 square feet of double glue line with western mill veneers.

After assembly, the panel is preferably, but not necessarily, subjected, at ambient temperature, typically being from 15° to 30° C., to a pressure sufficient to bring the plies into contact with each other to consolidate the plies. Generally, a pressure in the range of 25 to 400 pounds per square inch is used. The plies are subjected to the pressure until a sufficient initial or pre-press bond is obtained to keep the plies from separating or coming apart upon the release of the pressure. A bond of the required strength is usually obtained in a contact time in the range of 0.5 to 20 minutes, although in a particular type of panel construction a satisfactory bond may be obtained in the time required to attain contact pressure or the pressure necessary to bring the plies into contact with each other.

After consolidation, the pressure is released and the panels are stored for as long as is needed awaiting the final pressing at an elevated temperature. Consolidation of the panels by pre-pressing permits the panels to be handled much more easily and quickly than one stage procedures and therefore allows a greater extent of automation. In final pressing, the panels may be subjected to the pressures and temperatures normally employed for heat setting of the particular phenol-aldehyde adhesive. Pressures of from 50 to 500 pounds per square inch at temperatures in the range of 90° C. to 200° C. are often used. The panels are subjected to the pressing for a sufficient time to bring the panels up to the curing temperature of the adhesive which, for the normal type of panel construction, will usually require 1 to 20 minutes.

The following examples are presented for the purpose of further illustrating and explaining the present invention and are not to be taken as limiting in any regard. Unless otherwise indicated, all parts and percentages are by weight.

EXAMPLE I

This example illustrates the preparation of a five-ply wood laminate employing four high moisture content plies of southern pine.

The two outermost plies had moisture contents of about 14% based on the dry weight of the wood. The two inner plies had a moisture content of 7%. The center ply had a moisture content of about 5%. An adhesive was applied to the surfaces of the plies to be mated in an amount of from 75 to 90 pounds per 1000 square foot of double glue line. The adhesive was prepared from 912 parts of phenol-formaldehyde condensation product, 50 parts of 50% caustic, 50 parts of Glu-x, 50 parts of Co-Cob and 200 parts of water.

To prepare panels, the five plies of adhesive coated wood were assembled and pressured in two stages. The first pressing stage was done in a cold prepress for 3½ minutes at a pressure of 175 pounds per square inch. The second pressing stage was done in a hot press at a temperature of 300° F. under a pressure of 200 pounds per square inch for 7 minutes. A total of 50 panels were prepared in this manner and checked for failure due to blows.

EXAMPLE II

The procedure of Example I was then repeated, but this time employing four outermost plies having moisture contents of 19% and a central ply having a moisture content of 5%. A total of 25 panels were prepared in this manner and checked for failure due to blow. No blows occurred.

EXAMPLE III

This Example compares test panels made from high moisture content plies prepared according to the procedure of Examples I and II, and control panels made by the same procedures, except that all plies had equal moisture contents. The panels blew when the press was opened.

| Panel | | Outer Ply Moisture (%) | Inner Ply Moisture (%) | Center Ply | Blows |
|---|---|---|---|---|---|
| Example I | Test | 14 | 7 | 5 | none |
| | Control | 5 | 5 | 5 | all |
| Example II | Test | 19 | 19 | 5 | none |
| | Control | 5 | 5 | 5 | all |

The above description is presented for the purpose of enabling those people skilled in the art to make and use the present invention, and it is not intended to detail all those obvious modifications and variations which will become apparent upon reading. It is intended, however, that all those obvious modifications and variations be included within the present invention, the scope of which is defined by the claims.

What is claimed is:

1. A process for making wood laminates from a plurality of wood plies which comprises:
    (a) providing two surface plies having a moisture content of from 7 to 25% based on the dry weight of the wood;
    (b) providing a center ply having a moisture content which is at least 1% and which is less than the moisture content of the surface plies;
    (c) applying an adhesive to the mating surfaces of the plies;
    (d) assembling a panel of the plurality of wood plies by mating the surfaces to which the adhesive has been applied; and
    (e) pressing the assembled plies under conditions of pressure, temperature and time effective to cure the adhesive.
2. A process according to claim 1 wherein the surface plies have a moisture content of from 7 to 22%.
3. A process according to claim 1 wherein the central ply has a moisture content of from 3 to 7%.
4. A process according to claim 1 wherein the adhesive comprises a member selected from the group consisting of phenol-aldehyde resins, urea-aldehyde resins, melamine-aldehyde resins and combinations thereof.
5. A process according to claim 1 wherein the adhesive comprises a phenol-aldehyde resin having a molar ratio of phenol to aldehyde in the range of 1:1.8 to 1:2.5, and an alkaline catalyst selected from the group consisting of alkaline earth and alkali metal hydroxides.
6. A process according to claim 1 wherein the adhesive comprises a hydroxybenzene-formaldehyde condensation product.
7. A process according to claim 1 wherein the adhesive is applied to the mating surfaces of the plies in an amount of from 60 to 90 pounds per 1000 square feet of double glue line.
8. A process according to claim 1 wherein the pressing step is carried out at a temperature of from 90° to 200° C. under a pressure of from 50 to 500 pounds per square inch, for a time period of from 1 to 20 minutes.
9. A process according to claim 1 wherein the panel is subjected to a consolidating step prior to the final curing step, the consolidating step comprising:
    pressing the assembled plies under pressure for a time effective to create a bond of sufficient strength between them to hold them together in a unitary, consolidated panel.
10. A process according to claim 9 wherein the pressing in the consolidating step is carried out at a temperature of from 15° to 30° C. under a pressure of from 25 to 400 pounds per square inch.

* * * * *